US012397897B2

(12) United States Patent
Yoshimura

(10) Patent No.: US 12,397,897 B2
(45) Date of Patent: Aug. 26, 2025

(54) COMPOSITE STRUCTURE AND METHOD OF MANUFACTURING SAME

(71) Applicant: SUBARU CORPORATION, Tokyo (JP)

(72) Inventor: Kensuke Yoshimura, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 207 days.

(21) Appl. No.: 17/695,651

(22) Filed: Mar. 15, 2022

(65) Prior Publication Data

US 2022/0306268 A1 Sep. 29, 2022

(30) Foreign Application Priority Data

Mar. 26, 2021 (JP) ................................. 2021-053287

(51) Int. Cl.
*B64C 1/12* (2006.01)
*B29C 70/68* (2006.01)
*B64C 1/06* (2006.01)
*B64C 1/00* (2006.01)

(52) U.S. Cl.
CPC .............. *B64C 1/12* (2013.01); *B29C 70/682* (2013.01); *B64C 1/064* (2013.01); *B64C 2001/0072* (2013.01)

(58) Field of Classification Search
CPC ..................................................... B64C 1/12
See application file for complete search history.

(56) References Cited

U.S. PATENT DOCUMENTS

| 5,817,269 | A | * | 10/1998 | Younie | B29C 33/38 249/82 |
| 6,217,000 | B1 | * | 4/2001 | Younie | B29D 99/0003 264/258 |
| 2010/0127122 | A1 | * | 5/2010 | Cosentino | B64C 1/12 244/117 R |
| 2012/0025022 | A1 | * | 2/2012 | Buchs | B29C 66/131 244/129.5 |
| 2012/0104170 | A1 | * | 5/2012 | Gallant | B64C 1/068 244/132 |
| 2019/0055001 | A1 | * | 2/2019 | Kamo | B29C 70/202 |
| 2022/0258847 | A1 | * | 8/2022 | Labordus | B29C 65/3676 |

FOREIGN PATENT DOCUMENTS

JP 2010-525979 A 7/2010

* cited by examiner

*Primary Examiner* — Michael H Wang
(74) *Attorney, Agent, or Firm* — Smith, Gambrell & Russell, LLP

(57) ABSTRACT

There is provided a method of manufacturing a composite structure of an aircraft. The composite structure includes a skin and a reinforcing material. The method includes, by stacking unhardened composite sheets on a region of a jig adjacent to a holding portion to hold the reinforcing material, forming a skin inner layer including a retainer to retain two end portions of a flange of the reinforcing material in a width direction of the flange. The method includes installing the reinforcing material at the holding portion of the jig so that the two end portions abut upon the retainer. The method includes, by stacking unhardened composite sheets on an outer surface of the flange and on an outer surface of the skin inner layer, forming a skin outer layer. The method includes hardening the skin inner layer and the skin outer layer.

18 Claims, 10 Drawing Sheets

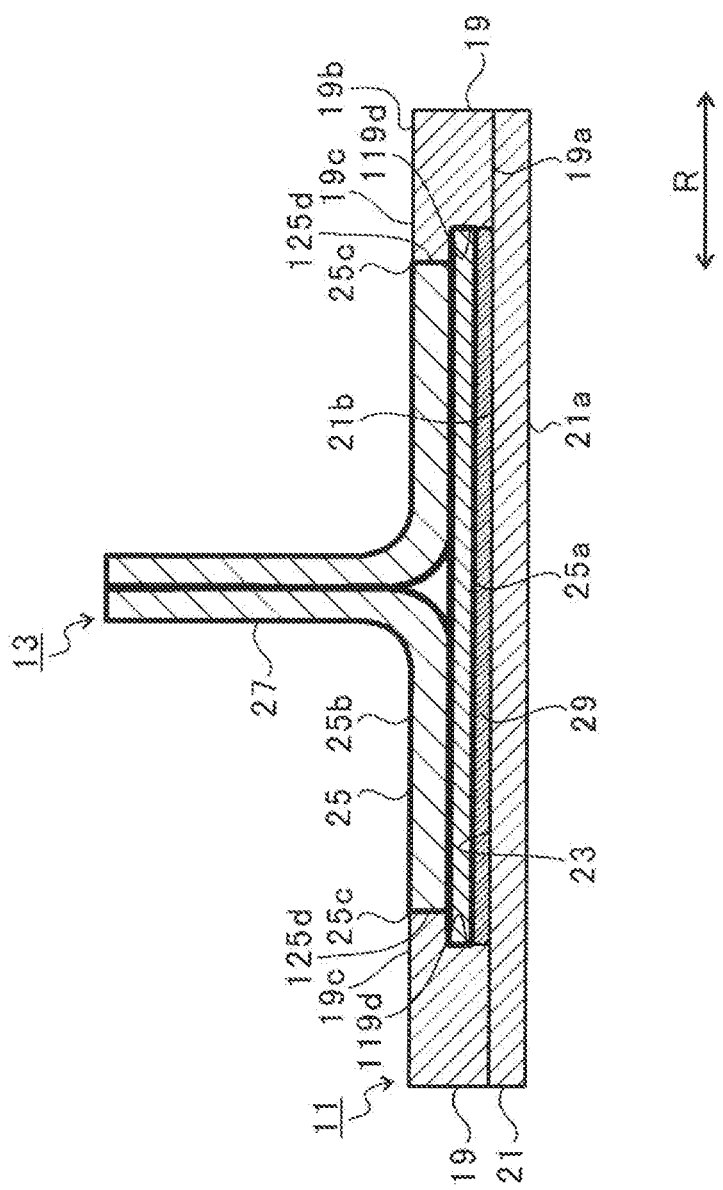

COMPOSITE STRUCTURE AND METHOD OF MANUFACTURING SAME

CROSS-REFERENCE TO RELATED APPLICATIONS

The present application claims priority from Japanese Patent Application No. 2021-053287 filed on Mar. 26, 2021, the entire contents of which are hereby incorporated by reference.

BACKGROUND

The disclosure relates to a composite structure and a method of manufacturing the same.

Recent aircraft structures are to be reduced in weight due to improvements in fuel consumption. As a method of reducing weight, carbon-fiber composite materials are increasingly being used and adhesive bonding, instead of bolt coupling known in the art, is increasing being performed on a coupled portion of each member. However, in current assembly of a composite structure, bonding is less reliable. Therefore, considering fail-safe characteristics, similarly to metal members known in the art, members are to be reinforced with respect to each other by fastening them with bolts (chicken fasteners or arresting fasteners). Therefore, the members are fastened with several hundred thousand bolts in the entire airframe.

For example, Japanese Unexamined Patent Application Publication (Translation of PCT Application) (JP-A) No. 2010-525979 discloses a composite structure that allows an outer plate of a wing of an aircraft to be formed. The composite structure in JP-A No. 2010-525979 includes a panel (outer plate) and stringers (reinforcing materials) coupled to a surface of the panel. The panel has a recessed portion, and run-outs (a pair of end portions in a longitudinal direction) of each stringer are provided with a pad that is engageable with the recessed portion. The pad of each stringer engages with the recessed portion of the panel. An adhesive is provided between each stringer and the panel. The pad of each stringer and the recessed portion of the panel are fastened with a fastener.

SUMMARY

An aspect of the disclosure provides a method of manufacturing a composite structure of an aircraft. The composite structure includes a skin and a reinforcing material. The method includes, by stacking unhardened composite sheets on a region of a jig, forming a skin inner layer of the skin. The region is adjacent to a holding portion to hold the reinforcing material. The skin inner layer includes a retainer to retain two end portions of a flange of the reinforcing material in a width direction of the flange. The method includes installing the reinforcing material at the holding portion of the jig so that the two end portions of the flange of the reinforcing material abut upon the retainer of the skin inner layer. The method includes, by stacking unhardened composite sheets on an outer surface of the flange of the reinforcing material and on an outer surface of the skin inner layer, forming a skin outer layer of the skin. The method includes hardening the skin inner layer and the skin outer layer.

An aspect of the disclosure provides a composite structure of an aircraft. The composite structure includes a skin and a reinforcing material. The skin includes a skin inner layer and a skin outer layer. The skin inner layer includes a retainer that abuts upon and retains two end portions of a flange of the reinforcing material in a width direction of the flange. The skin outer layer is stacked on an outer surface of the flange of the reinforcing material and an outer surface of the skin inner layer, and is adhered to the outer surface of the flange of the reinforcing material.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

FIG. 11 is a schematic sectional view illustrating a composite structure according to a modification.

DETAILED DESCRIPTION

In order to fasten members using a fastener as described in JP-T No. 2010-525979 above, the pad of each stringer and the recessed portion of the panel are subjected to hole formation and bolt fastening, as a result of which the assembly time is considerably increased. In addition, the weight of the composite structure is increased due to the bolt fastening.

Therefore, it is desirable to provide a composite structure and a method of manufacturing the same, which make it possible to reduce the assembly time and weight.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

1. Overall Structure of Aircraft

Figure 1:
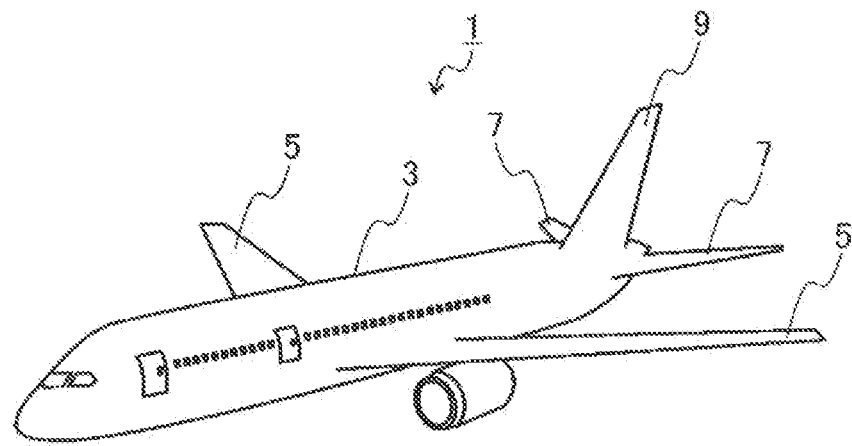
FIG. 1 is a schematic perspective view of an aircraft according to an embodiment of the disclosure.

First, referring to FIG. 1, an overall structure of an aircraft 1 according to an embodiment of the disclosure is described. FIG. 1 is a schematic perspective view of the aircraft 1 according to an embodiment of the disclosure.

As illustrated in FIG. 1, the aircraft 1 includes a fuselage 3, main wings 5, horizontal tails 7, and a vertical tail 9. The main wings 5, the horizontal tails 7, and the vertical tail 9 may also be simply called wings below.

The fuselage 3 is a central structural member of an airframe of the aircraft 1, and its length in a front-back direction (roll axis direction) is longer than its length in a left-right direction (pitch axis direction) and its length in an up-down direction (yaw axis direction). The interior of the fuselage 3 has a boarding space that allows passengers to board the aircraft, and is provided with various devices, such as a driving source (for example, an engine), a fuel tank, an operating device, and a measuring instrument.

The pair of main wings 5 are provided, one on the left and one on the right of a central portion of the fuselage 3. The pair of main wings 5 are disposed so that one protrudes toward the left and the other protrudes toward the right from the central portion of the fuselage 3. The main wings 5 cause the aircraft 1 to generate an upward lift.

The pair of horizontal tails 7 are provided, one on the left and one on the right of a back portion of the fuselage 3. The pair of horizontal tails 7 are disposed so that one protrudes toward the left and the other protrudes toward the right from the back portion of the fuselage 3. The horizontal tails 7 have the function of maintaining stability around the pitch axis of the aircraft 1.

The vertical tail 9 is provided on an upper side of the back portion of the fuselage 3. The vertical tail 9 protrudes upward from the back portion of the fuselage 3. The vertical tail 9 has the function of maintaining stability around the yaw axis of the aircraft 1.

Since a composite structure of the aircraft 1 according to the embodiment is desirably applied to, for example, structural members of the fuselage 3, examples of structural members of the fuselage 3 are described in detail below. However, the composite structure of the aircraft of the disclosure may also be applied to, for example, wings (such as the main wings 5), instead of to the fuselage 3.

2. Internal Structure of Fuselage

Figure 2:
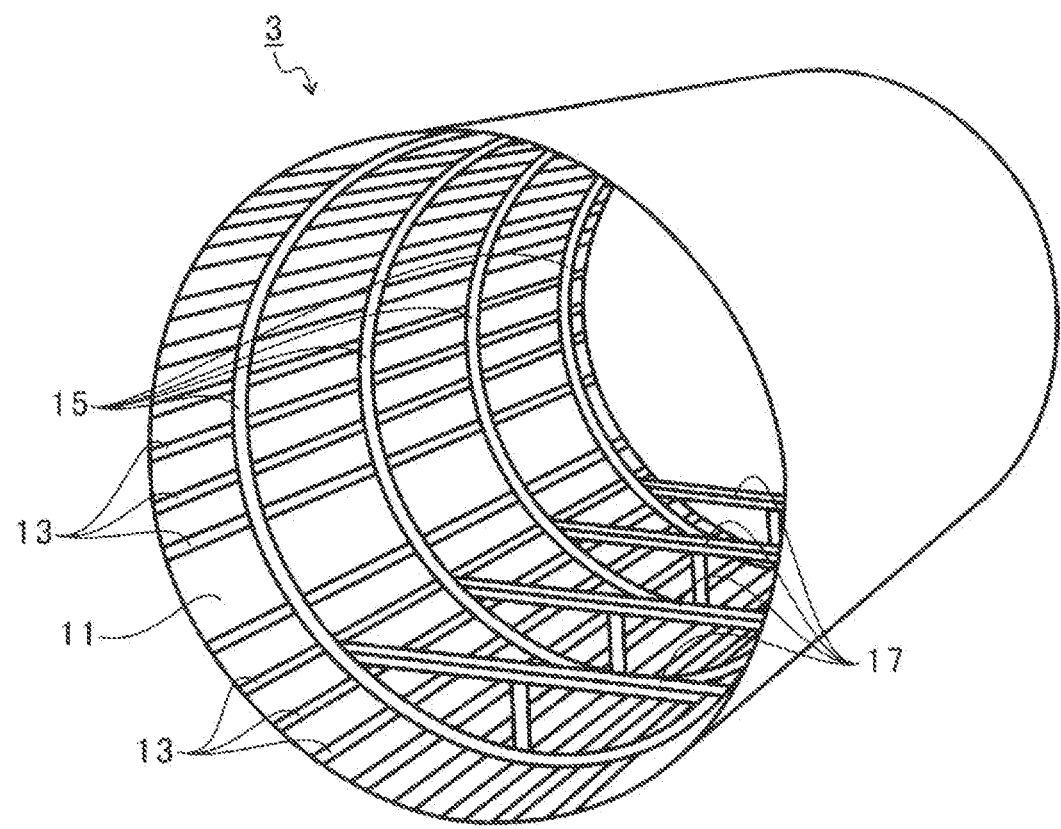
FIG. 2 is a schematic perspective view illustrating a part of structural members of a fuselage according to the embodiment.

FIG. 2 is a schematic perspective view illustrating, as an example of the composite structure of the aircraft 1 according to the embodiment, a part of the structural members of the fuselage 3. As illustrated in FIG. 2, the fuselage 3 includes a skin 11 (outer plate), a plurality of stringers 13, a plurality of frames 15, and a plurality of floor beams 17. In one embodiment, the stringers 13 may serve as "reinforcing materials". Here, each stringer 13 is one example of a reinforcing material that constitutes the composite structure of the fuselage 3.

The skin 11 has a substantially circular cylindrical shape. The skin 11 forms an outer skin of the fuselage 3. An outer surface of the skin 11 is exposed to space outside the fuselage 3, and an inner surface of the skin 11 forms an internal space of the fuselage 3.

The plurality of stringers 13 are mounted on the inner surface of the skin 11, and extend in the front-back direction (the roll axis direction) of the airframe of the aircraft 1. The plurality of strings 13 are disposed apart from each other in a peripheral direction of an inner peripheral surface of the skin 11. The plurality of stringers 13 may be disposed at equal intervals or at unequal intervals in the peripheral direction of the inner peripheral surface of the skin 11.

The plurality of stringers 13 function as reinforcing materials that reinforce the skin 11 of the fuselage 3, and are examples of reinforcing materials that reinforce the skin of the disclosure. In the embodiment, as the composite structure of the aircraft 1, an example of a structure in which the plurality of stringers 13 (which are examples of reinforcing materials as described above) are mounted on the inner surface of the skin 11 of the fuselage 3 is described. However, the composite structure of the aircraft of the disclosure is not limited to such an example. For example, the skin of the disclosure may be, in addition to the skin 11 of the fuselage 3 above, outer skins of the wings (the main wings 5, the horizontal tails 7, or the vertical tail 9) of the aircraft 1, or the skin of other parts (such as an outer plate or an inner plate). The reinforcing materials of the disclosure may be, in addition to the stringers 13 of the fuselage 3 above, reinforcing materials that reinforce the wings (the main wings 5, the horizontal tails 7, or the vertical tail 9) of the aircraft 1, or reinforcing materials that reinforce the skin of other parts.

The plurality of frames 15 are mounted on the inner surface of the skin 11, and extend in a direction intersecting (orthogonal to) the plurality of stringers 13. In the embodiment, the plurality of frames 15 extend in the peripheral direction of the inner peripheral surface of the skin 11. Each frame 15 is an example of a reinforcing material that reinforces the skin 11 of the fuselage 3.

The plurality of floor beams 17 are mounted, one on each frame 15. The plurality of floor beams 17 are disposed on a lower portion of the fuselage 3 in the up-down direction. The plurality of floor beams 17 constitute a part of a floor of the boarding space that allows passengers to board the aircraft. The plurality of floor beams 17 have the function of being subjected to a load that is applied to the floor.

Of the fuselage 3, at least the skin 11 and the stringers 13 are made of a composite material, such as Carbon Fiber Reinforced Plastics (CFRP). However, the skin 11 and the stringers 13 may be made of other types of fiber-reinforced plastics, such as Glass-Fiber-Reinforced Plastics (GFRP) or Aramid-Fiber-Reinforced Plastics (AFRP). Therefore, compared with when the skin 11 and the stringers 13 are made of a metal material, the specific strength can be considerably increased, and the weight can be reduced.

The composite structure of the aircraft 1 according to the embodiment refers to, among structural bodies of the aircraft, a structural body that is made of a composite material, such as such fiber-reinforced plastics. In recent years, such a composite structure of the aircraft 1 is to be reduced in weight due to improvements in fuel consumption. As a method of reducing weight, composite materials, such as CFRP, are increasingly being used as structural materials of, for example, the skin and reinforcing materials, and adhesive bonding using an adhesive, instead of bolt fastening known in the art, are increasing being performed on a coupled portion where the structural materials are coupled to each other.

In the composite structure of the aircraft 1 according to the embodiment, in addition to adhesive bonding using an adhesive, mechanical coupling is also performed by devising a good method of molding the coupled portion where the structural materials are coupled to each other. Therefore, with the fail-safe characteristics being maintained, it is possible to reduce costs due to a reduction in, for example, the weight of the composite structure and the number of components, and elimination of, for example, fasteners and jigs, and to reduce assembly manhours with respect to composite structures using arresting fasteners in an adhesive structure. The composite structure of the aircraft 1 and a method of manufacturing the same according to the embodiment are described in detail below.

3. Coupling Structure of Skin and Stringers

Figure 3:
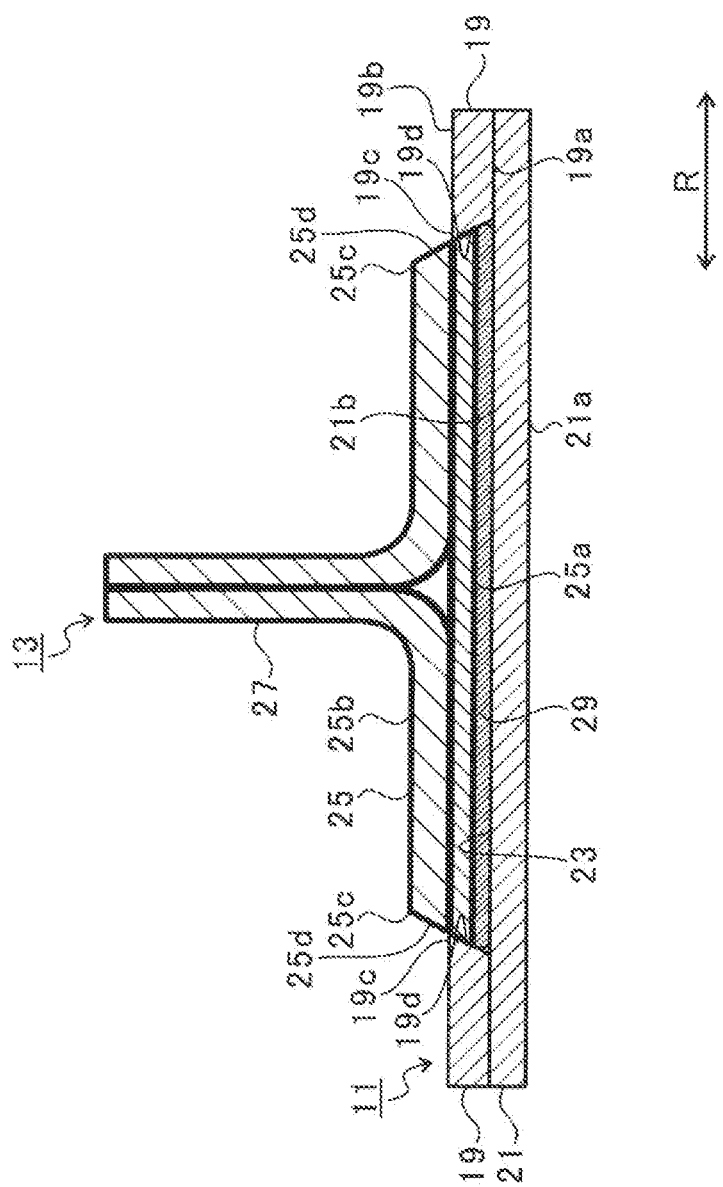
FIG. 3 is a schematic sectional view illustrating a coupling structure of a skin and stringers according to the embodiment.

FIG. 3 is a schematic sectional view illustrating a coupling structure of the skin 11 and the stringers 13 according to the embodiment. As illustrated in FIG. 3, the skin 11 includes a skin inner layer 19 and a skin outer layer 21. The skin inner layer 19 is positioned on a portion of the skin 11 on an inner-surface side of the fuselage 3, and the skin outer layer 21 is positioned on a portion of the skin 11 on an outer-surface side of the fuselage 3. An inner surface 21b of the skin outer layer 21 is coupled to an outer surface 19a of the skin inner layer 19. Therefore, the skin inner layer 19 and the skin outer layer 21 are permanently affixed to each other to constitute the skin 11. In this way, the skin 11 has a two-layer layered structure including the skin inner layer 19 and the skin outer layer 21.

The skin outer layer 21 is formed over the entire outer surface of the skin 11. In contrast, the skin inner layer 19 is not formed over the entire inner surface of the skin 11, and a region in which the skin inner layer 19 is not formed exists on a part of an inner-surface side of the skin 11. In this way, the skin 11 has, on the inner-surface side of the fuselage 3, a hollow portion 23 at the location where the skin inner layer 19 is not formed, and forms a space for embedding a flange 25 of each stringer 13. The flanges 25 of the corresponding stringers 13 are embedded in the hollow portion 23 of the skin 11, and are engageable with the hollow portion 23.

As illustrated in FIG. 3, each stringer 13 is, for example, a structural material having a T shape in cross section. Each stringer 13 includes the flange 25 and a web 27. Each flange 25 is a long member having a flat belt shape, and is coupled perpendicularly to the corresponding web 27. As illustrated in FIG. 3, at least a part of each flange 25 is disposed inside the hollow portion 23 of the skin 11. Each flange 25 includes an outer surface 25a, an inner surface 25b, and a pair of end portions 25c in a width direction. Note that the width direction of each flange 25 is towards the left and right (directions indicated by a double-headed arrow R) in FIG. 3.

Each web 27 is a long member having a flat belt shape. In the embodiment, each stringer 13 has a T-shape in cross section, and is a structural member in which the flange 25 and the corresponding web 27 are coupled to each other in a T shape. However, the shape of each stringer 13 in cross section is not limited to this example, and may be other shapes, such as an H shape, an I shape, an L shape, or a C shape. In the embodiment, each stringer 13 is constituted by coupling a plurality of composite parts. However, each stringer 13 is not limited thereto. Each stringer 13 may be constituted by a single composite part. The composite structure of the embodiment is constituted by the skin 11, the stringers 13, and an adhesive layer 29.

The outer surface 25a of each flange 25 is positioned inside the hollow portion 23 of the skin 11. Inside the hollow portion 23, the adhesive layer 29 is provided between the outer surface 25a of each flange 25 and the inner surface 21b of the skin outer layer 21. The adhesive layer 29 adheres the outer surface 25a of each flange 25 and the inner surface 21b of the skin outer layer 21 to each other. That is, the adhesive layer 29 is interposed between the flange 25 of each stringer 13 and the skin outer layer 21 of the skin 11 to adhere the stringers 13 to the skin 11. However, the adhesive layer 29 may not be disposed between the outer surface 25a of each flange 25 and the inner surface 21b of the skin outer layer 21. For example, the outer surface 25a of each hardened flange 25 and the inner surface 21b of the unhardened skin outer layer 21 may be directly coupled to each other by, for example, co-bonding.

The inner surface 25b of each flange 25 is a surface on a side opposite to the outer surface 25a, and is positioned outside the hollow portion 23 of the skin 11. However, the inner surface 25b of each flange 25 may be positioned inside the hollow portion 23 of the skin 11. Each web 27 is coupled to a central position of the inner surface 25b of the corresponding flange 25 in the width direction. Each web 27 stands in a direction orthogonal to the inner surface 25b of the corresponding flange 25.

Parts of the end portions 25c of each flange 25 in the width direction are disposed inside the hollow portion 23 of the skin 11, and the remaining parts of the end portions 25c are disposed outside the hollow portion 23. End surfaces 25d of the end portions 25c of each flange 25 are tapered surfaces. In the embodiment, the width of each flange 25 (left-right direction R in FIG. 3) differs depending upon the position on each flange 25 in the thickness direction (up-down direction in FIG. 3), and the width of each flange 25 gradually decreases toward the inner surface 25b from the outer surface 25a. Therefore, the end surfaces 25d of each flange 25 are tapered surfaces that incline toward the inner surface 25b from the outer surface 25a to approach the corresponding web 27. In one embodiment, the tapered surfaces may serve as "first tapered surfaces".

Here, the skin inner layer 19 includes retainers 19c that are positioned to face the hollow portion 23. Each retainer 19c of the skin inner layer 19 abuts upon the corresponding end portion 25c of each flange 25 that is positioned inside the hollow portion 23. Each retainer 19c retains the corresponding end portion 25c of each flange 25 so that each flange 25 does not separate from the inside of the hollow portion 23.

An end surface 19d of each retainer 19c in the left-right direction R in FIG. 3 is a tapered surface. Therefore, in the embodiment, the end surface 19d of each retainer 19c is a tapered surface that inclines toward the inner surface 19b from the outer surface 19a of the skin inner layer 19 to approach the corresponding web 27. In one embodiment, the tapered surfaces may serve as "second tapered surfaces".

The end surfaces 19d of the two retainers 19c of the skin inner layer 19 each abut upon at least a part of a corresponding one of the two end surfaces 25d of each flange 25. In one embodiment, the end surfaces 19d may serve as "second tapered surfaces". In one embodiment, the end surfaces 25d may serve as "first tapered surfaces". Since the end surfaces 19d of the corresponding retainers 19c each cover the end surface 25d of the corresponding end portion 25c of each flange 25, the two end portions 25c of each flange 25 are retained by the two retainers 19c. Therefore, the movement of each flange 25 in a direction away from the skin 11 (the adhesive layer 29), that is, the up-down direction in FIG. 3, is restricted. In this way, the flanges 25 of the stringers 13 engage with the hollow portion 23 of the skin 11, and the two end portions 25c of each flange 25 abut upon and are retained by the two retainers 19c of the skin inner layer 19. As a result, the flanges 25 of the stringers 13 are mechanically coupled to the skin 11.

According to the embodiment, even if a load in a direction away from the skin 11 is applied to the stringers 13, and an adhesive structure where the flanges 25 of the stringers 13 and the skin 11 are adhered to each other by the adhesive layer 29 is peeled, the flanges 25 of the stringers 13 are mechanically coupled to the skin 11 by the retainers 19c of the skin 11 above. In this way, in the embodiment, there is provided a mechanically coupling structure (for example, the retainers 19c and the hollow portion 23) that functions as a fail-safe structure when the adhesive structure of the skin 11 and the stringers 13 is peeled. Therefore, it is possible not to use a bolt fastening structure (for example, chicken fasteners or arresting fasteners), used for fastening structural members to each other, that has been hitherto used as a fail-safe structure. As a result, since it is possible not to, for example, form holes and perform bolt fastening for the bolt fastening structure, it is possible to considerably reduce the assembly time. Since a large number of bolts is not used, it is possible to reduce the weight of the composite structure of the aircraft 1.

Figure 4:
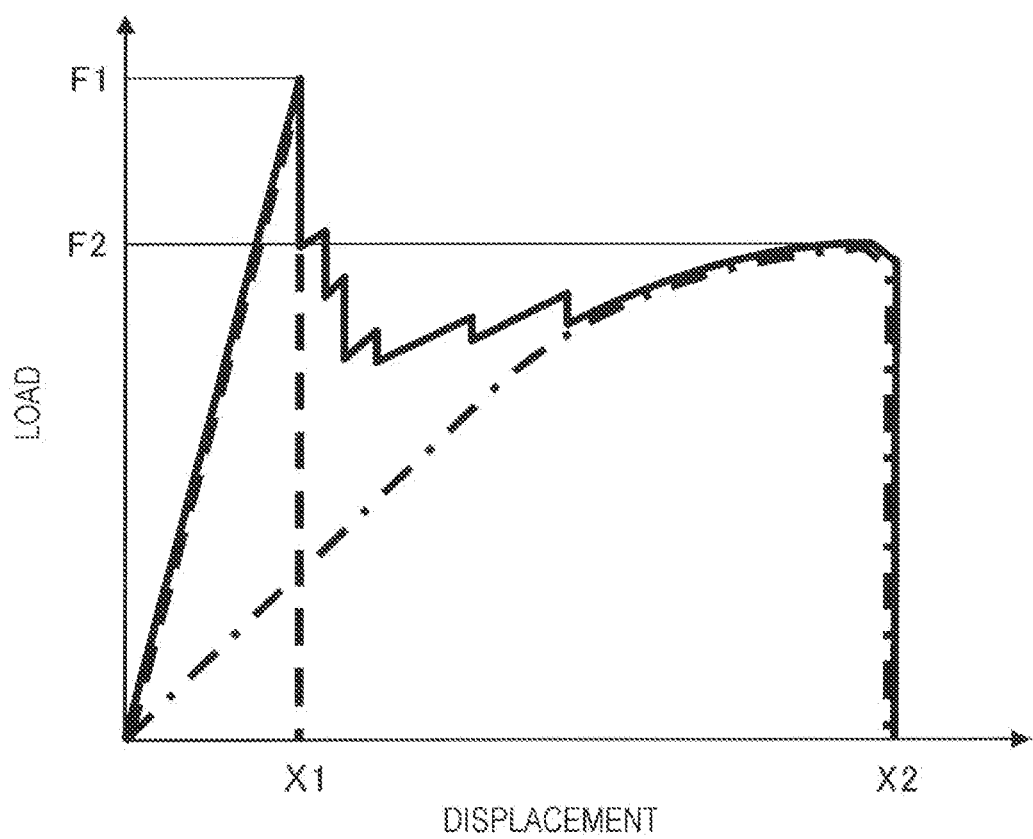
FIG. 4 is a load-displacement diagram of a composite structure according to the embodiment.

Referring to FIG. 4, the strength of the coupling structure of the skin 11 and the stringers 13 according to the embodiment is described. FIG. 4 is a load-displacement diagram of the composite structure according to the embodiment.

In FIG. 4, the vertical axis indicates a load that is applied in the direction in which the skin 11 and the stringers 13 are separated from each other, and the horizontal axis indicates the displacement of the stringers 13 with respect to the skin 11. In FIG. 4, the broken line is a load-displacement curve when the skin 11 and the stringers 13 are coupled to each other by the adhesive structure alone. The alternate long and short dash line is a load-displacement curve when the skin 11 and the stringers 13 are coupled to each other by the mechanically coupling structure using the retainers 19c alone. The solid line is a load-displacement curve when the skin 11 and the stringers 13 are coupled to each other by both the adhesive structure and the mechanically coupling structure.

In FIG. 4, as indicated by the broken line, when the skin 11 and the stringers 13 are coupled to each other by the adhesive structure alone, and when a load F1 is applied in the direction in which the skin 11 and the stringers 13 are separated from each other and the displacement becomes a displacement X1, the adhesive structure using the adhesive layer 29 is fractured. In FIG. 4, as indicated by the alternate long and short dash line, when the skin 11 and the stringers 13 are coupled to each other by the mechanically coupling structure using the retainers 19c alone, and when a load F2 is applied in the direction in which the skin 11 and the stringers 13 are separated from each other and the displacement becomes a displacement X2, the mechanically coupling structure using the retainers 19c is fractured. Here, the load F1 is larger than the load F2, and the displacement X1 is smaller than the displacement X2.

In contrast, according to the composite structure of the embodiment, in FIG. 4, as indicated by the solid line, when the load F1 is applied in the direction in which the skin 11 and the stringers 13 are separated from each other and the displacement becomes the displacement X1, the adhesive structure using the adhesive layer 29 is fractured. However, the composite structure of the embodiment includes, in addition to the adhesive structure, the mechanically coupling structure using the retainers 19c. Therefore, after the adhesive structure has been fractured, the retainers 19c of the mechanically coupling structure can also be subjected to the load to make it possible to suppress the growth of a crack in the coupled portion where the skin 11 and the stringers 13 are coupled to each other and to suppress immediate breakage of the skin 11 and the stringers 13. For example, as illustrated in FIG. 4, after the adhesive structure has been fractured by the load F1, the load acting upon the coupled portion where the skin 11 and the stringers 13 are coupled to each other increases to the load F2, and, until the displacement increases to the displacement X2, the flanges 25 of the stringers 13 do not separate from the hollow portion 23 of the skin 11, and the coupling of the skin 11 and the stringers 13 is maintained.

In the composite structure of the embodiment, there is a difference between the rigidity of the adhesive structure using the adhesive layer 29 and the rigidity of the mechanically coupling structure using the retainers 19c (rigidity difference). Here, the rigidity of the adhesive structure is higher than the rigidity of the mechanically coupling structure. Therefore, during the time until the adhesive structure is fractured, the adhesive structure is capable of properly transmitting the load between the skin 11 and each stringer 13. On the other hand, during the time after the adhesive structure has started to fracture to when the adhesive structure completely breaks, the mechanically coupling structure using the retainers 19c can be subjected to a part of the load to divide the applied load between both the adhesive structure and the mechanically coupling structure. Therefore, it is possible to suppress the growth of a crack from a location on the adhesive structure where the fracturing is started and to suppress immediate breakage.

Here, if the rigidity of the adhesive structure is lower than the rigidity of the mechanically coupling structure, when the mechanically coupling structure is fractured, the adhesive structure is also immediately fractured. That is, a crack in the adhesive structure grows immediately, and the skin 11 and the stringers 13 are immediately broken. Therefore, in the embodiment, the rigidity of the adhesive structure using the adhesive layer 29 is higher than the rigidity of the mechanically coupling structure using the retainers 19c. Consequently, it is possible to provide a composite structure of the aircraft 1 that is capable of suppressing the growth of a crack in the coupled portion of the structural members. Thus, even if there is a defect in the adhesive structure of the structural members and, for example, peeling occurs in the adhesive structure, the mechanically coupling structure becomes a fail-safe structure, and early fracturing of the composite structure of the aircraft 1 can be suppressed.

4. Method of Manufacturing Composite Structure

Figure 8:
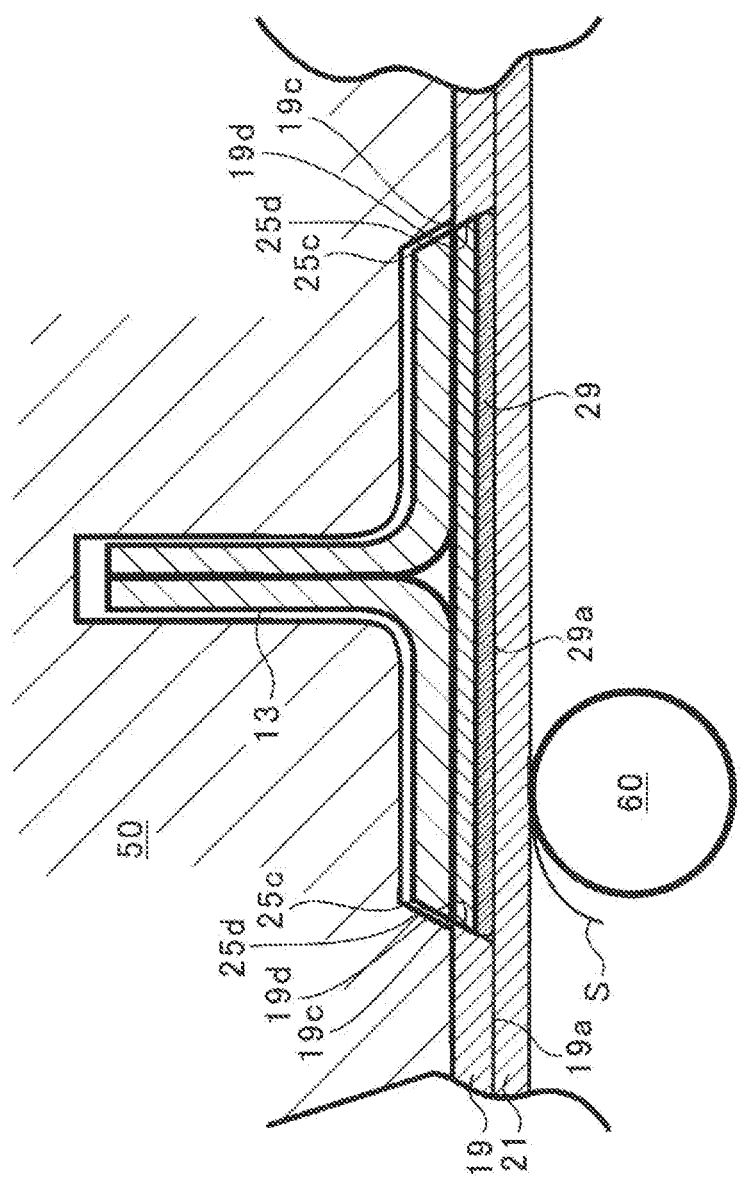
FIG. 8 is a sectional view illustrating a second stacking step of forming a skin outer layer according to the embodiment.
Figure 9:
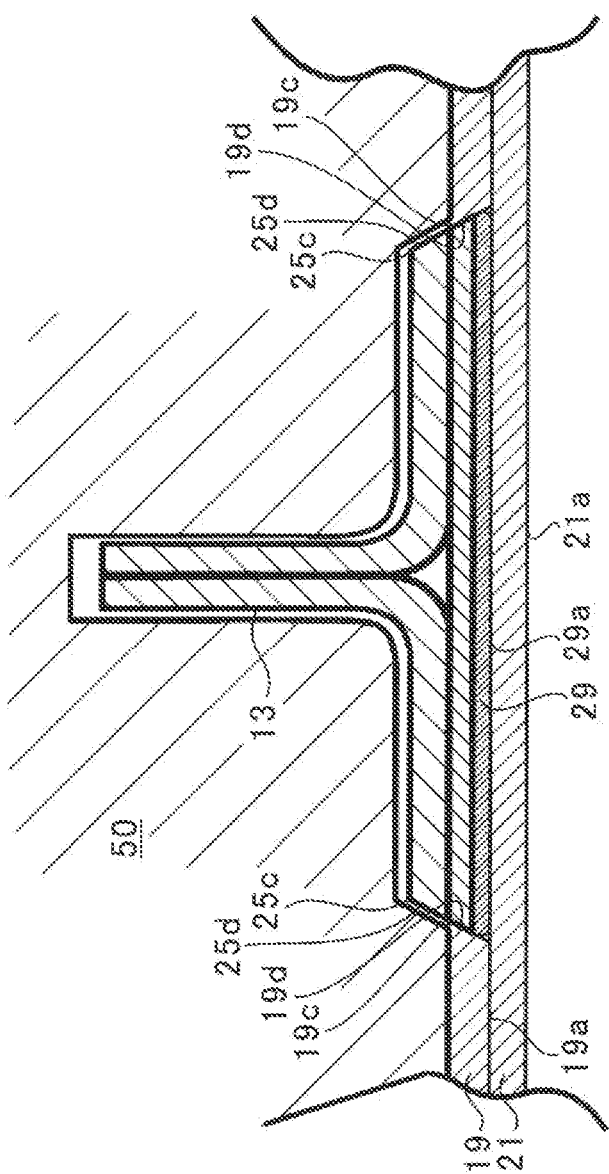
FIG. 9 is a sectional view illustrating a hardening step of hardening the skin after stacking the skin outer layer according to the embodiment.
Figure 10:
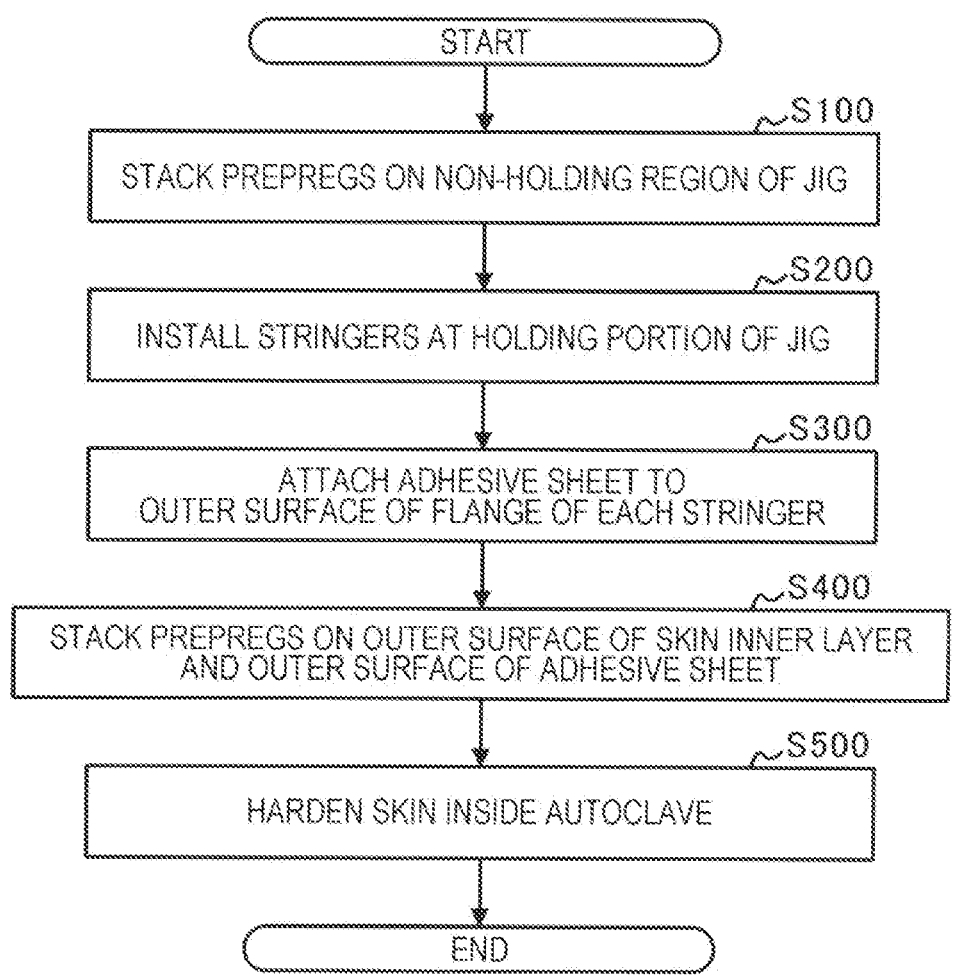
FIG. 10 is a flowchart illustrating a method of manufacturing the composite structure according to the embodiment.

Next, referring to FIG. 5 to FIG. 10, a method of manufacturing the composite structure of the aircraft 1 according to the embodiment is described. FIG. 10 is a flowchart illustrating the method of manufacturing the composite structure according to the embodiment.

(1) First Stacking Step

Figure 5:
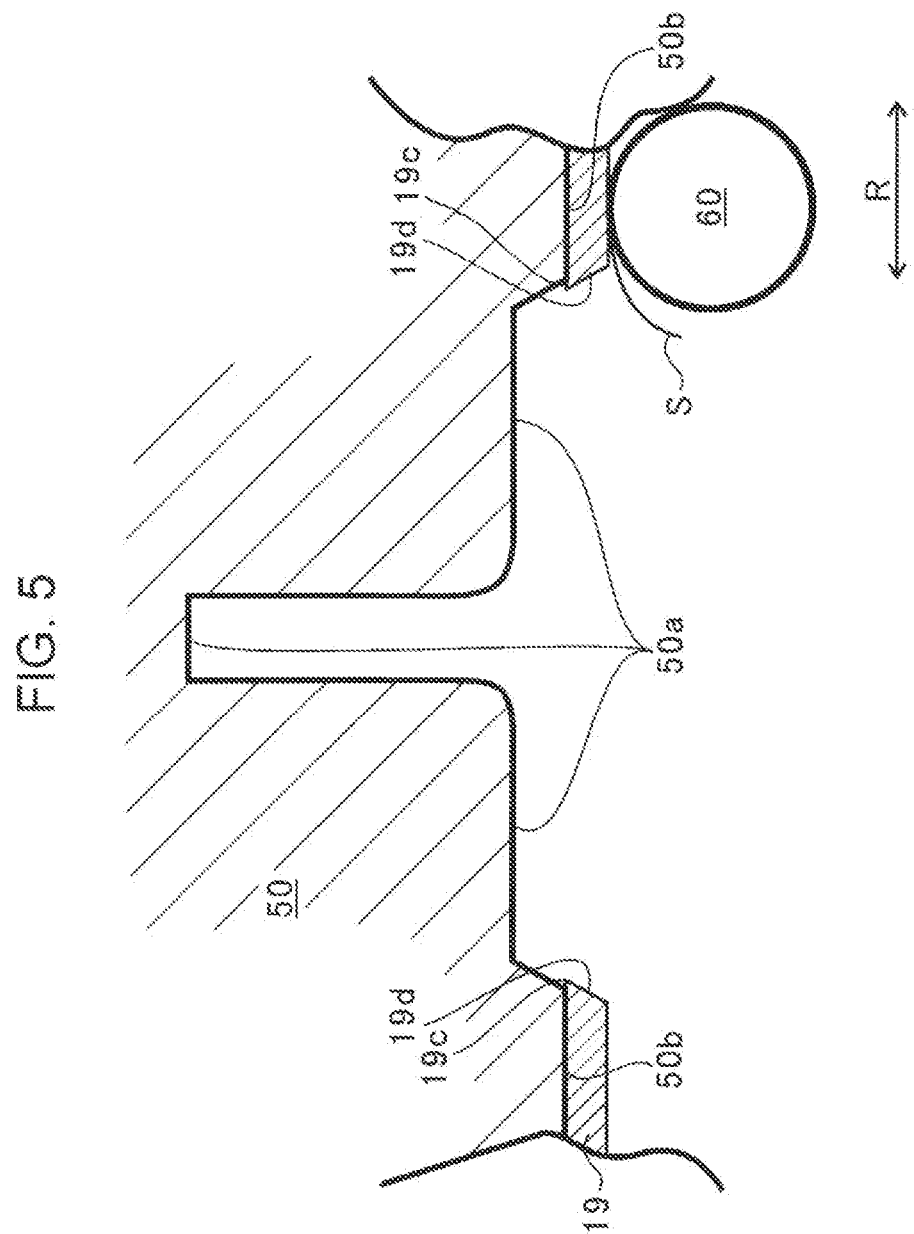
FIG. 5 is a sectional view illustrating a first stacking step of forming a skin inner layer according to the embodiment.

FIG. 5 is a sectional view illustrating a first stacking step of forming the skin inner layer 19 in the method of manufacturing the composite structure according to the embodiment. As illustrated in FIG. 5, the skin inner layer 19 is formed by stacking unhardened composite sheets S (prepregs) on a surface of a jig 50 by a stacking device 60.

The stacking device 60 stacks the composite sheets S on a region 50b (non-holding region), which differs from a holding portion 50a for holding the stringers 13, of the surface of the jig 50, and forms the skin inner layer 19 (first stacking step of FIG. 10: Step S100). The holding portion 50a is formed at a portion of the jig 50 that is recessed inward with respect to the non-holding region 50b. The region 50b is a region of the surface of the jig 50 that is adjacent to the holding portion 50a.

The stacking device 60 stacks the composite sheets S having different lengths in a peripheral direction R of the fuselage 3 for respective layers of the skin inner layer 19. The stacking device 60 stacks composite sheets S having longer lengths with decreasing distance to the surface (the non-holding region 50b) of the jig 50. As a result, the retainers 19c and the end surfaces 19d above are formed at the skin inner layer 19. In one embodiment, the end surfaces 19d may serve as tapered surfaces.

(2) Installing Step

Figure 6:
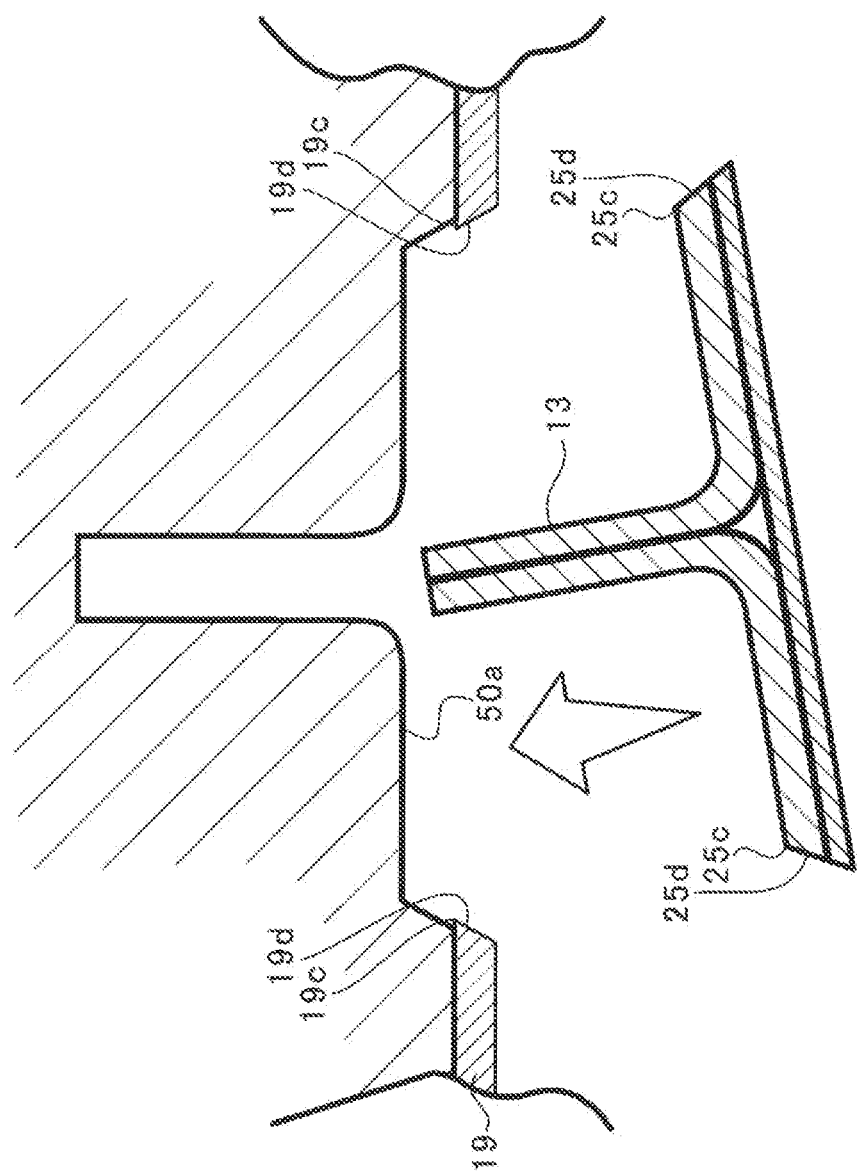
FIG. 6 is a sectional view illustrating an installing step of installing each stringer on a jig according to the embodiment.

FIG. 6 is a sectional view illustrating an installing step of installing each stringer 13 on the jig 50. As illustrated in FIG. 6, after the skin inner layer 19 has been formed, each stringer 13 is installed in the holding portion 50a that is the portion of the jig 50 that is recessed inward with respect to the non-holding region 50b (installing step of FIG. 10: Step S200). Here, for example, hardened stringers 13 are installed in the holding portion 50a. However, the stringers 13 are not limited thereto, and, thus, unhardened stringers 13 may be installed in the holding portion 50a.

With each stringer 13 positioned in the holding portion 50a, each stringer 13 is held by a holding tool (not illustrated). At this time, the two end portions 25c (the end surfaces 25d) of each flange 25 each overlap the corresponding retainer 19c (the corresponding end surface 19d) of the skin inner layer 19 in a thickness direction of each flange 25, and the end surfaces 25d of each flange 25 each abut upon the end surface 19d of the corresponding retainer 19c (see FIG. 7). A part of each end surface 25d of each flange 25 overlaps a corresponding one of the end surfaces 19d of the skin inner layer 19 in the thickness direction of each flange 25.

(3) Attaching Step

Figure 7:
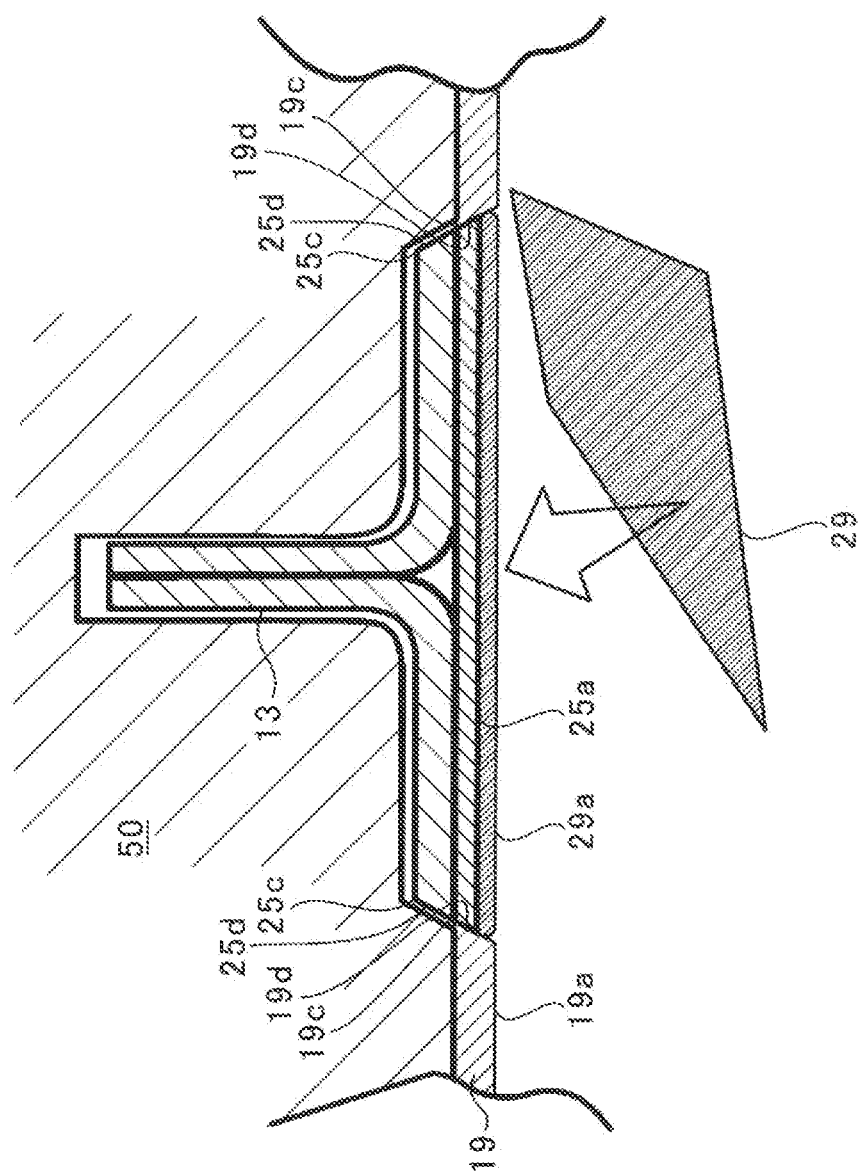
FIG. 7 is a sectional view illustrating an attaching step of mounting an adhesive layer on an outer surface of a flange of each stringer according to the embodiment.

FIG. 7 is a sectional view illustrating an attaching step of mounting the adhesive layer 29 on the outer surface 25a of the flange 25 of each stringer 13. As illustrated in FIG. 7, the adhesive layer 29 of the embodiment is constituted by an adhesive film and is attached to the outer surface 25a of each flange 25 (attaching step of FIG. 10: Step S300). However, the adhesive layer 29 is not limited thereto, and, thus, the adhesive layer 29 may be constituted by a liquid adhesive and may be applied to the outer surface 25a of each flange 25. When the adhesive layer 29 is attached to the outer surface 25a of each flange 25, the outer surface 19a of the skin inner layer 19 and an outer surface 29a of the adhesive layer 29 are substantially flush with each other.

(4) Second Stacking Step

FIG. 8 is a sectional view illustrating a second stacking step of forming the skin outer layer 21. As illustrated in FIG. 8, the skin outer layer 21 is formed by stacking unhardened composite sheets S (prepregs) on the outer surface 19a of the skin inner layer 19 and the outer surface 29a of the adhesive layer 29 by the stacking device 60 (second stacking step of FIG. 10: Step S400). However, it is not limited thereto, and, when the adhesive layer 29 is not to be provided, the skin outer layer 21 may be formed on (stacked on) the outer surface 19a of the skin inner layer 19 and the outer surface 25a of each flange 25.

Since the outer surface 19a of the skin inner layer 19 and the outer surface 29a of the adhesive layer 29 are substantially flush with each other, a hollow or a protrusion is less likely to be formed at the outer surface 21a of the skin outer layer 21 (the outer surface of the fuselage 3) (see FIG. 9). Note that the material of the composite sheets S that constitute the skin outer layer 21 is the same as the material of the composite sheets S that constitute the skin inner layer 19. However, the materials are not limited thereto, and, thus, the material of the composite sheets S that constitute the skin outer layer 21 may differ from the material of the composite sheets S that constitute the skin inner layer 19.

(5) Hardening Step

FIG. 9 is a sectional view illustrating a hardening (curing) step of hardening (curing) the skin 11 after stacking the skin outer layer 21. After stacking the skin outer layer 21, the skin 11 (the skin inner layer 19 and the skin outer layer 21), the stringers 13, and the adhesive layer 29 that are being held by the jig 50 are introduced into an autoclave (not illustrated) and heated. At this time, the skin 11 (the skin inner layer 19 and the skin outer layer 21) that has been heated inside the autoclave is hardened (hardening step of FIG. 10: Step S500). By hardening the skin 11, the composite structure according to the embodiment illustrated in FIG. 3 is formed.

Although, a desirable embodiment of the disclosure has been described with reference to the attached drawings above, it goes without saying that the disclosure is not limited to such an embodiment. As long as a person is one skilled in the art, it is obvious that, in the category described in the claims, various modifications or corrections may be arrived at, and such modifications and corrections are understood as naturally belonging to the technical scope of the disclosure.

In the embodiment above, an embodiment in which the end surfaces 19d of the corresponding retainers 19c of the skin inner layer 19 and the end surfaces 25d of each flange 25 are tapered surfaces is given and described. However, the end surfaces 19d and the end surfaces 25d are not limited thereto, and, thus, the end surfaces 19d and the end surfaces 25d may be include stepped surfaces instead of being tapered surfaces.

FIG. 11 is a schematic sectional view of a composite structure according to a modification of the embodiment. Regarding the structural elements that are substantially equivalent to those of the composite structure of the embodiment above, the same reference numerals are added and the same descriptions thereof are omitted. As illustrated in FIG. 11, end surfaces 125d of each flange 25 in a width direction include stepped surfaces (first stepped surfaces). End surfaces 119d of the retainers 19c in the left-right direction R include stepped surfaces (second stepped surfaces). The end surfaces 125d (first stepped surfaces) of each flange 25 each abut upon the end surface 119d (second stepped surface) of the corresponding retainer 19c, and a part of each retainer 19c covers a part of the corresponding end portion 25c of each flange 25. According to the modification, similarly to the embodiment above, it is possible to reduce the assembly time and the weight of the composite structure. The end surfaces 119d and the end surfaces 125d of the modification are constituted by the stepped surfaces. Therefore, compared with when the end surfaces 19d and the end surfaces 25d are constituted by tapered surfaces as in the embodiment above, it is possible to increase the thickness of the retainers 19c and to increase the strength of the retainers 19c.

The invention claimed is:

1. A composite structure of an aircraft, the composite structure comprising:
   a skin; and
   a reinforcing material,
   wherein the skin comprises
   a skin inner layer that comprises an inner surface, an outer surface, and a retainer extending between the inner and outer surfaces of the skin inner layer, and wherein the retainer abuts upon and retains two end portions of a flange of the reinforcing material in a width direction of the flange, and a skin outer layer that is stacked on an outer surface of the flange of the reinforcing material and the outer surface of the skin inner layer, and that is adhered to the outer surface of the flange of the reinforcing material, and wherein the flange has an inner surface spaced from the flange outer surface and a free end peripheral region extending between the flange inner and outer surfaces at each of the two end portions of the flange, and wherein the flange inner surface, in an outer-to-inner direction, is farther removed from the skin outer layer than the flange outer surface, and the free end peripheral region at each of the two end portions of the flange abut, respectively, common configured peripheral abutting regions of the skin inner layer defining the retainer, and wherein, at a location where the inner surface of the flange reaches the free end peripheral region of the flange, the inner surface of the flange is either coplanar with the inner surface of the skin inner layer at a location where the inner surface of the skin inner layer reaches the retainer in abutment with the free end peripheral region of the flange or the inner surface of the flange is more inward, in the outer-to-inner direction, from the skin outer layer than is the inner surface of the inner skin inner layer at a location where the inner surface of the inner skin inner layer reaches the retainer in abutment with the free end peripheral region of the flange.

2. The composite structure according to claim 1, wherein the skin comprises a hollow portion at a location where the skin inner layer is not formed, and wherein, with the flange of the reinforcing material embedded in the hollow portion of the skin, the two end portions of the flange in the width direction of the flange are retained by the retainer of the skin inner layer.

3. The composite structure according to claim 2, wherein the free end peripheral region of the flange in the width direction comprises a first tapered surface, and wherein the retainer of the skin inner layer comprises a second tapered surface that abuts upon the first tapered surface.

4. The composite structure according to claim 2, further comprising:

an adhesive layer that adheres the skin outer layer of the skin and the flange of the reinforcing material to each other, wherein a rigidity of an adhesive structure that adheres the skin and the reinforcing material to each other by the adhesive layer is higher than a rigidity of a mechanically coupling structure that couples the skin and the reinforcing material to each other by the retainer.

5. The composite structure according to claim 1, wherein the free end peripheral region of the flange in the width direction comprises a first tapered surface, and wherein the retainer of the skin inner layer comprises a second tapered surface that shares a common taper slope and abuts upon the first tapered surface.

6. The composite structure according to claim 5, further comprising:

an adhesive layer that adheres the skin outer layer of the skin and the flange of the reinforcing material to each other, wherein a rigidity of an adhesive structure that adheres the skin and the reinforcing material to each other by the adhesive layer is higher than a rigidity of a mechanically coupling structure that couples the skin and the reinforcing material to each other by the retainer.

7. The composite structure according to claim 5, wherein the skin inner layer comprises a plurality of stacked composite sheets having longer lengths with increasing distance from the skin outer layer.

8. The composite structure according to claim 1, further comprising:

an adhesive layer that adheres the skin outer layer of the skin and the flange of the reinforcing material to each other, wherein a rigidity of an adhesive structure that adheres the skin and the reinforcing material to each other by the adhesive layer is higher than a rigidity of a mechanically coupling structure that couples the skin and the reinforcing material to each other by the retainer.

9. The composite structure according to claim 1, wherein the common configuration is one of common angle abutting sloped surfaces in each of the retainer and the flange.

10. The composite structure according to claim 1, wherein the common configuration comprises meshing step surfaces in each of the retainer and the skin inner layer.

11. The composite structure according to claim 1, wherein the common configuration features coplanar contact surfaces in each of the retainer and the skin inner layer.

12. The composite structure according to claim 1, wherein, at the location where the inner surface of the flange reaches the free end peripheral region of the flange, the inner surface of the flange is farther removed, in the outer-to-inner direction, from the skin outer layer than is the inner surface of the skin inner layer at the location where the inner surface of the skin inner layer reaches the retainer in abutment with the free end peripheral region of the flange.

13. The composite structure of claim 1 wherein an adhesive layer provides the adherence, and wherein a rigidity of the adhesive bond coupling is greater than a rigidity of the retainer coupling the skin and the flange.

14. The composite structure according to claim 1, wherein, at the location where the inner surface of the flange reaches the free end peripheral region of the flange, the inner surface of the flange is coplanar with the inner surface of the skin inner layer at a location where the inner surface of the skin inner layer reaches the retainer in abutment with the peripheral end portion of the flange.

15. A composite structure of an aircraft comprising:

a first layer extending along a first axis and a second axis orthogonal to the first axis, the first layer comprising a first surface and a second surface, the first surface facing a first direction along a third axis orthogonal to the first axis and the second axis, the second surface facing a second direction opposite to the first direction along the third axis;

a flange having a flat belt shape extending along the first axis, the flange comprising a third surface facing the first direction and a fourth surface facing the second direction, the fourth surface being adhered on the first surface of the first layer via an adhesive layer so that the fourth surface covers a first region of the first surface;

a web formed on the third surface of the flange, the web protruding from the third surface in the first direction;

a first tapered surface formed at a first end in a third direction along the second axis of the flange, the first tapered surface being formed entirely along a direction of the third axis of the flange, the first tapered surface facing the third direction and the first direction;

a second tapered surface formed at a second end in a fourth direction opposite to the third direction along the second axis of the flange, the second tapered surface being formed entirely along the direction of the third axis of the flange, the second tapered surface facing the fourth direction and the first direction;

a second layer formed on the first surface of the first layer, the second layer directly coupled with the first layer in a second region excluding the first region;

a third tapered surface formed in the second layer, the third tapered surface facing the first tapered surface, the third tapered surface directly contacting the first tapered surface, an end of the third tapered surface in the first direction being located in the second direction relative to an end of the first tapered surface in the first direction; and a fourth tapered surface formed in the second layer, the fourth tapered surface facing the second tapered surface, the fourth tapered surface directly contacting the second tapered surface, an end of the fourth tapered surface in the first direction being located in the second direction relative to an end of the second tapered surface in the first direction, wherein the flange and the second layer do not directly contact each other except at portions where the first and second tapered surfaces contact the third and fourth tapered surfaces, and wherein the third surface of the flange is exposed in the first direction without being covered by a skin of the aircraft, the skin including the first layer and the second layer.

16. The composite structure according to claim 15, wherein the second layer comprising a fifth surface facing the first direction and a sixth surface facing the second direction, the sixth surface being bonded to the first surface,
wherein the third and fourth tapered surfaces are formed entirely along a direction of the third axis of the second layer from the fifth surface to the sixth surface, and
wherein the third surface of the flange is positioned in the first direction relative to the fifth surface.

17. The composite structure according to claim 16, wherein the first tapered surface and the third tapered surface entirely contact each other along the third axis from a position of the fourth surface to a position of the fifth surface, and
wherein the second tapered surface and the fourth tapered surface entirely contact each other along the third axis from the position of the fourth surface to the position of the fifth surface.

18. The composite structure according to claim 17, wherein a rigidity of an adhesive structure adhering the first layer and the flange via the adhesive layer is higher than a rigidity of a mechanically coupling structure coupling the first layer and the flange by contacts of the first and second tapered surfaces with the third and fourth tapered surfaces.

* * * * *